United States Patent
Brown

(10) Patent No.: US 7,649,288 B1
(45) Date of Patent: Jan. 19, 2010

(54) SYSTEM AND METHOD FOR PROVIDING ROTATION CONTROL IN A LIMITED ROTATION MOTOR SYSTEM

(75) Inventor: David C. Brown, Northborough, MA (US)

(73) Assignee: GSI Group Corporation, Bedford, MA (US)

( * ) Notice: Subject to any disclaimer, the term of this patent is extended or adjusted under 35 U.S.C. 154(b) by 163 days.

(21) Appl. No.: 11/859,843

(22) Filed: Sep. 24, 2007

Related U.S. Application Data

(60) Provisional application No. 60/828,247, filed on Oct. 5, 2006.

(51) Int. Cl.
*H02K 7/06* (2006.01)
(52) U.S. Cl. ........................ 310/75 D; 310/90
(58) Field of Classification Search ........... 310/75 A, 310/75 D, 90, 49 R
See application file for complete search history.

(56) References Cited

U.S. PATENT DOCUMENTS

| | | | |
|---|---|---|---|
| 3,624,574 A | | 11/1971 | Montagu |
| 3,631,274 A | * | 12/1971 | Stauder et al. ............... 310/66 |
| 3,959,673 A | | 5/1976 | Montagu |
| 4,125,790 A | * | 11/1978 | Stratienko ................ 310/75 D |
| 4,135,119 A | | 1/1979 | Brosens |
| 4,546,295 A | * | 10/1985 | Wickham et al. ........... 318/372 |
| 4,550,814 A | * | 11/1985 | Harry ....................... 192/18 B |
| 4,694,212 A | | 9/1987 | Montagu |
| 5,225,770 A | | 7/1993 | Montagu |

* cited by examiner

*Primary Examiner*—Dang D Le
(74) *Attorney, Agent, or Firm*—Gauthier & Connors LLP

(57) ABSTRACT

A limited rotation motor system is disclosed that includes a rotor shaft mounted within first and second bearing units. The rotor shaft is coupled to a helically shaped torsion member that is fixed with respect to a motor housing.

21 Claims, 3 Drawing Sheets

SYSTEM AND METHOD FOR PROVIDING ROTATION CONTROL IN A LIMITED ROTATION MOTOR SYSTEM

PRIORITY

This application claims priority to U.S. Provisional Patent Application No. 60/828,247 filed Oct. 5, 2006.

BACKGROUND

The invention generally relates to limited rotation motors (sometimes referred to as galvanometer motors), and relates in particular to systems for controlling the movement of limited rotation motors.

Limited rotation motors move within a limited radial range of motion only. Certain limited rotation motor systems employ a torsion bar, one end of which is fixed and the other end of which moves with the limited rotation motor shaft. The motor acts against a force caused by the torsion bar that resists rotation. When the motor drives the shaft to one swing of its motion range and then turns off, the torsion bar applies torque to the shaft to return the shaft to its neutral position.

For example, FIG. 1 shows a limited rotation motor system 10 that includes a clamp hub 12, and a torsion bar 14 that is fixed to the clamp hub 12. The system also includes a torsion bar hub 16, and a magnetic rotor 18 (having a generally rectangular cross-sectional area) on a shaft that is supported by a rear bearing 20 and a front bearing 22. The front bearing is fixed to the housing frame, while the rear bearing is slidably attached to the housing frame. The clamp hub 12, torsion bar 14, and torsion hub 16 are spot welded together. The torsion hub 16 and rotor 18 are soldered together. The torsion bar stores potential energy when the rotor 18 is rotated, and releases the energy when the power to the motor (stator windings) is turned off.

The bearings are typically manufactured with a degree of manufacturing tolerance that provides a small amount of play between the balls and the bearing races or rings. This play may be reduced by a process called radial pre-loading that applies a force vector across the bearing, making the outer ring eccentric with respect to the inner ring; and this eccentricity is limited by the presence of a ball or balls trapped between the rings. For example, FIG. 2 shows a bearing having an inner ring 30, an outer ring 32, and a plurality of bearing balls 34 between the inner and outer rings. Radial pre-loading involves establishing a force vector as shown at A that brings the inner and outer rings closer together at a location in an effort to reduce unwanted play in the bearing system. Such radial pre-loading may be achieved, for example, by including a small asymmetric notch in the rotor 18 as shown at 24. This imbalance causes asymmetric radial magnetic forces to be applied to the rotor, which creates the force as indicated at A.

It has been found, however, that radial pre-loading does not fully remove play in certain bearing systems. It has further been found that the use of a torsion bar may provide excessive resistive torque forces near the range limit of certain limited rotation motors. Also, the very high axial stiffness of the torsion bar causes Brinelling of the front bearing under conditions of temperature extreme due to the difference in coefficient of thermal expansion between the torsion bar and the stator frame.

There is a need therefore, for a limited rotation motor control system for providing improved performance of a limited rotation motor. There is further a need for an improved limited rotation motor system that is efficient and economical to manufacture.

SUMMARY

The invention provides a limited rotation motor system that includes a rotor shaft mounted within first and second bearing units. The rotor shaft is coupled to a helically shaped torsion member that is fixed with respect to a motor housing in accordance with an embodiment. In accordance with further embodiments, a helically shaped pre-loading member is provided for pre-loading an outer ring of the first bearing unit. In accordance with yet a further embodiment, the invention provides that an inner ring of the first bearing unit applies a pre-loading force to an inner ring of the second bearing unit.

BRIEF DESCRIPTION OF THE DRAWINGS

The following description may be further understood with reference to the accompanying drawings in which.

The drawings are shown for illustrative purposes only.

DETAILED DESCRIPTION

Figure 1:
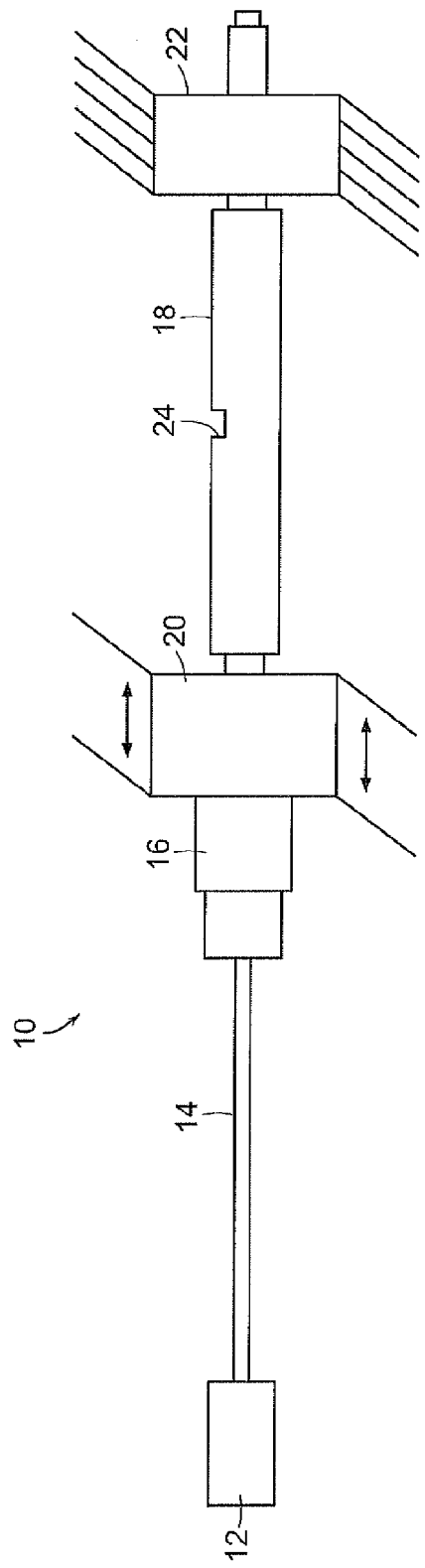
FIG. 1 shows an illustrative diagrammatic side view of a limited rotation motor of the prior art.
Figure 2:
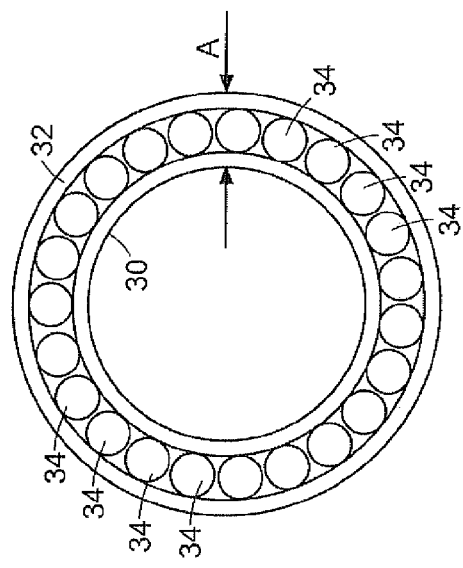
FIG. 2 shows an illustrative diagrammatic cross-sectional view of a bearing in the system of FIG. 1 undergoing radial pre-loading in accordance with the prior art.
Figure 3:
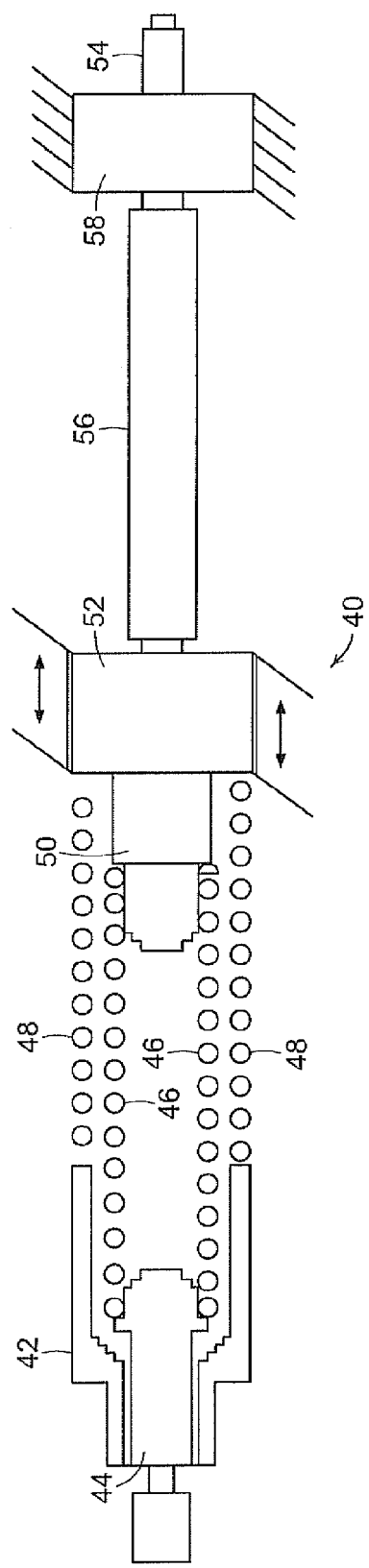
FIG. 3 shows an illustrative diagrammatic side sectional view of a limited rotation motor in accordance with an embodiment of the invention.

FIG. 3 shows an illustrative diagrammatic sectional view of a system 40 in accordance with an embodiment of the invention. The system 40 includes a clamp hub 42 that is welded to a spring hub 44. A helically shaped inner torsion spring 46 is soldered to the spring hub 44, and a helically shaped outer spring 48 is positioned between the clamp hub 42 and an outer ring of a rear bearing 52 that is slidably mounted in a motor housing. The forward end of the inner spring 46 is soldered to a torsion spring hub 50, which is in turn soldered to a shaft 54 on which is fixed a rotor 56 having a generally rectangular cross-sectional area. The shaft 54 passes through a front bearing 58 that is fixed to the motor housing.

The outer spring 48 and the inner spring 46 should have the same spring rate (defined as force divided by deflection) so that when compressed by the same amount they will add or subtract the same force. This function is linear in the elastic deflection range in which operation occurs. The spring rate of an open-wound helical spring is the same in both directions; that is, if it is compressed, it produces a proportional force that may be referred to as a positive force. If instead the spring is extended the same amount, the same force is obtained with an opposite sign.

Figure 4B:
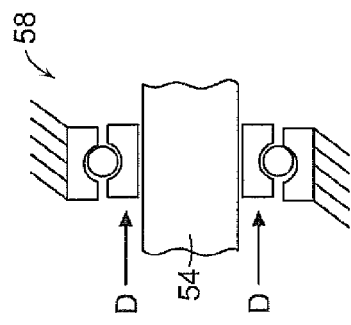
FIG. 4B shows an illustrative diagrammatic end view of the front bearing in the system of FIG. 3 undergoing pre-loading in accordance with an embodiment of the invention.
Figure 4A:
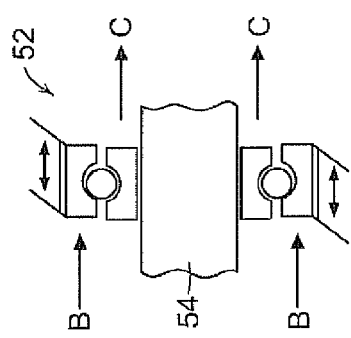
FIG. 4A shows an illustrative diagrammatic end view of the rear bearing in the system of FIG. 3 undergoing pre-loading in accordance with an embodiment of the invention.

If the outer spring produces a force on the outer ring of the rear bearing, then that force is transmitted to the inner ring of the front bearing because the rear bearing is free to slip in the bore while the front bearing is fixed in the bore. If the same force with the inner spring is then added, then the rear bearing is not affected, but the front bearing inner ring now has twice the force on it. With reference to FIG. 4A, the outer spring 48 provides a force as indicated at B on the outer ring of the rear bearing 52. This causes a force as indicated at C to be applied to the inner ring of the rear bearing 52. Since the rear bearing 52 is not fixed to the motor housing, this force is transferred to the inner ring of the front bearing 58 as shown at D.

The axle assembly is therefore pre-stressed by controlling the part dimensions so that in the assembly process, the rear bearing preload spring is compressed by the amount required for the desired preload. When the assembly is removed from the fixture, the outer spring relaxes by ½ its deflection, and the inner spring is extended by the same amount. This assembly is then installed in the bore, and the front bearing anchored in place. At this point, the front bearing has no preload, and the rear bearing has ½ the desired preload. The assembly is then compressed by ½ the preload developing distance, the extension from the inner spring is removed, and the inner spring will then again be in the neutral condition, the outer spring will again be compressed by the desired amount, and both bearings will be preloaded by the same amount.

The outer spring must fit in a hole diameter of 0.187 inches, and the outside of inner spring should have clearance inside the inside diameter of the outer spring. The desired preload force on each bearing is 0.1 pounds. The process for selecting materials and springs begins by choosing a mean diameter for the outer spring smaller that the hole diameter, e.g., 0.167 inches, and a material for the spring, e.g., stainless steel, which has an allowable shear stress of $50 \times 10^3$ psi. Using this trial mean diameter, the wire diameter is computed from $d = (8 LD_m/piS_s)^{1/3}$ where d=the wire diameter, L=load on the spring in pounds, $D_m$=the mean diameter of the spring, and $S_s$=the allowable shear stress. $D = ((8)(0.1)(0.167)/(3.141549)(50000))^{1/3} = 0.0095$ inches. The outside diameter of the spring will therefore be $D_o = D_m + 2 D/2 = D_m + D = 0.1765$, which is small enough to fit in the 0.187 hole. A different, larger mean diameter could also have been chosen and the calculation iterated until an outside diameter arbitrarily close to the hole size is achieved, remembering that coil springs expand in diameter when compressed so we need a small clearance.

The deflection of a helical coil spring is given by $f = 64 nR_m^3 L/d^4 Gk$ where f=spring deflection under the load, n=number of coils in the spring, $R_m$=the mean radius of the coil, G=the shear modulus of elasticity, and k=the curvature correction factor=$((4c-1)/(4c-4))+0.615/c$ for heavily loaded springs where c=$2R_m/d$.

$$c = (2)(0.0883)/0.0095 = 18.57$$

$$K = ((4)(18.57)-1)/((4(18.57)-4)+(0.615)(18.57) = 12.463$$

Assuming n=5 coils $f = (64)(5)(0.0835^3)(0.1)/(0.0095^4)(5 \times 10^6)(12.463) = 0.0367$ inches. The free length of the spring is given by L=(n+i)(d+F), where n=number of active turns, i=number of inactive turns, F=load, and d=wire diameter. If it is assumed that there are 2 inactive turns, then L=(5+2)(0.0095+0.1)=0.766 inches. By the same method, the dimensions of the inner spring may be determined.

Figure 5:
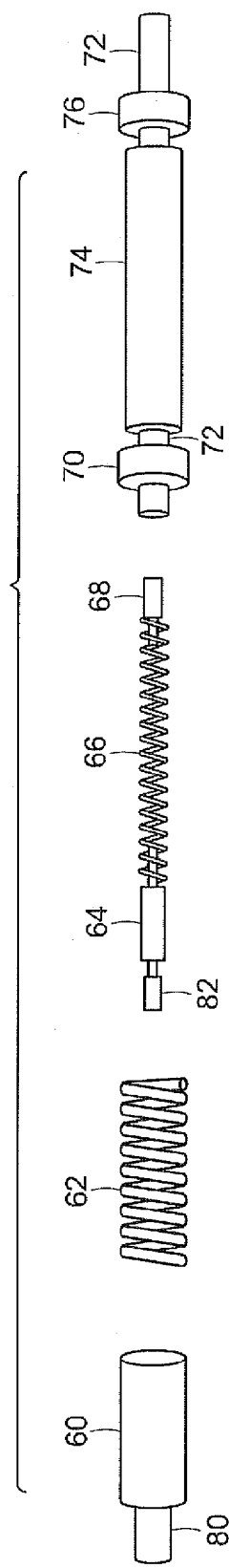
FIG. 5 shows an illustrative diagrammatic exploded view of a limited rotation motor system in accordance with another embodiment of the invention.
Figure 6:
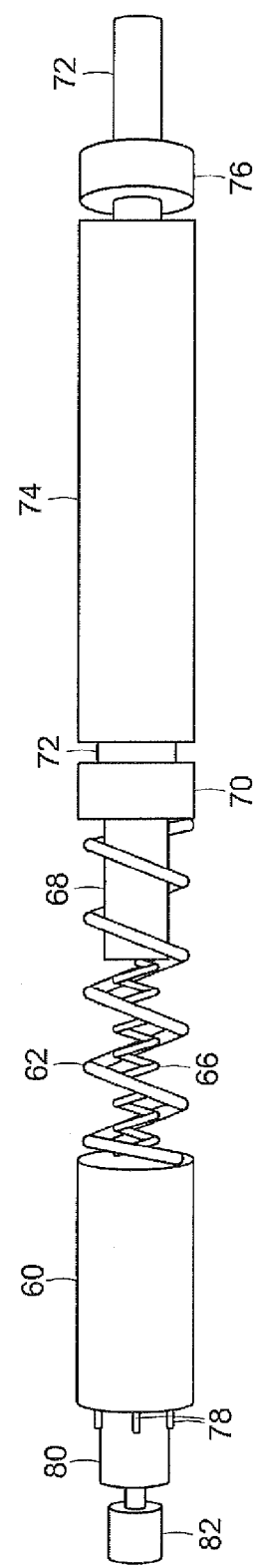
FIG. 6 shows an illustrative diagrammatic view of the limited rotation motor system of FIG. 5 assembled.

FIGS. 5 and 6 show exploded and assembly illustrations of a system in accordance with an embodiment of the invention that includes a clamp hub 60, an outer spring 62, an inner torsion spring clamp hub 64, an inner torsion spring 66, and a torsion spring shaft hub 68 that is fixed to the motor shaft 72. A rotor 74 is fixed to the motor shaft 72, and the motor shaft 72 rotates within a rear bearing 70 (that is slidable with respect to the motor housing) and rotates within a front bearing 76 (that is fixed with respect to the motor housing). The assembly is fixed in place once assembled by applying compressive radial crimps 78 into a rear portion 80 of the clamp hub 60 that engage the torsion spring clamp hub 64 in FIG. 6. A rear portion 82 of the torsion spring clamp hub 64 protrudes rearwardly of the assembly for mounting within a motor housing. The limited rotation motor may be used in a variety of scanning systems such as raster scanning systems and a variety of wafer processing systems.

The inner spring 66, therefore, is designed to be neither compressed nor stressed in the final assembly, causing the front bearing 70 and the rear bearing 76 to have the same pre-loading force. If it is desired that the rear bearing have a pre-loading force that is less than that of the pre-loading force of the front bearing, then the inner spring may be designed to be slightly compressed in the final assembly. If, on the other hand, it is desired that the rear bearing have a pre-loading force that is greater than that of the pre-loading force of the front bearing, then the inner spring may be designed to be slightly extended in the final assembly.

The prior art torsion bar is effectively infinitely stiff in the axial direction. As a result, differential thermal expansion between the torsion bar and the stator frame has the potential to forcibly remove all the internal axial clearance in the front bearing, which is fastened to the frame and the torsion bar. Under these circumstances, any additional decrease in the internal bearing dimension caused by further differential expansion damages the front bearing because the balls make dents in the rings, called Brinelling. On the other hand, this invention substitutes an axially compliant helical torsion member for the linearly stiff torsion bar of the prior art. Over the range of deflection encountered within the operating temperature range of the galvanometer, the helical torsion spring acts approximately as a constant-force axial spring, so that the preload of the bearing is not significantly effected, and the risk of Brinelling is entirely removed.

As an example, consider a galvanometer with a laminated silicon steel stator held together with epoxy, and a carbon steel torsion bar, and assume that the torsion bar is two inches in length. The coefficient of thermal expansion of 01 tool steel is approximately $8.2 \times 10^{-6}$ inches per inch per degree F. The coefficient of thermal expansion of epoxy is about $50 \times 10^{-6}$ inches per inch per degree F. The difference is $41.8 \times 10^{-6}$ inches per inch per degree F., times 2 inches, equals $83.6 \times 10^{-6}$ inches difference in length per degree F.

The internal clearance resolved into the axial direction in a typical bearing used in this application is $2 \times 10^{-3}$ inches at 70 F, assumed to be the assembly temperature. It is assumed that the clearance is symmetrical at assembly, and as a result is $1 \times 10^{-3}$ inches in both directions. Dividing $1 \times 10^{-3}$ inches by $83.6 \times 10^{-6}$ inches per degree yields 11.96 degrees F. as the temperature change required to take up all the internal clearance.

It is often the case that galvanometers are used in environments where the ambient temperature is above 70 F, and also that the temperature of the galvanometer rises above ambient during operation as the result of Ohmic losses in the galvanometer drive coils. As a result, it is evident that the prior art galvanometer scanner is at substantial risk of bearing damage in normal operation Those skilled in the art will appreciate that numerous modifications and variations may be made to the above disclosed embodiment without departing from the spirit and scope of the invention.

What is claimed is:

1. A limited rotation motor system for driving a rotor shaft in clockwise and counter-clockwise directions responsive to an applied electrical signal, wherein said rotor shaft is mounted within first and second bearing units and is coupled to a torsion member one end of which is fixed with respect to a motor housing, said torsion member being wound in helical form around an extension of an axis of rotation of the rotor shaft, said rotor being centered in its power-off rotational range by means of the torsion member, such rotational range being nominally equal in both the clockwise and the counter-clockwise directions, said torsion member also providing that a pre-loading force on each of the first and second bearing units may be independently adjusted.

2. The limited rotation motor system as claimed in claim 1, wherein said system further includes a helically shaped pre-loading member for applying a pre-loading force to an outer ring of said first bearing unit.

3. The limited rotation motor system as claimed in claim 2, wherein said helically shaped torsion member is positioned radially within said helically shaped pre-loading member.

4. The limited rotation motor system as claimed in claim 2, wherein an inner ring of said first bearing unit applies a pre-loading force to an inner ring of said second bearing unit.

5. The limited rotation motor system as claimed in claim 4, wherein the pre-loading force on said first bearing unit is substantially equal to the pre-loading force on said second bearing unit.

6. The limited rotation motor system as claimed in claim 4, wherein the pre-loading force on said first bearing unit is greater than the pre-loading force on said second bearing unit.

7. The limited rotation motor system as claimed in claim 4, wherein the pre-loading force on said first bearing unit is less than the pre-loading force on said second bearing unit.

8. A limited rotation motor system comprising a rotor shaft mounted within first and second bearing units, a pre-loading member for pre-loading an outer ring of said first bearing unit, and a torsion member fixed with respect to a motor housing, said pre-loading member and said torsion member providing that a pre-loading force on the first bearing unit may be adjusted, independent of the resistive torque provided by the torsion member, to be different than a pre-loading force on the second bearing unit.

9. The limited rotation motor system as claimed in claim 8, wherein said torsion member is coupled to a rotor shaft.

10. The limited rotation motor system as claimed in claim 8, wherein said pre-loading member and said torsion member are mutually co-axially positioned.

11. The limited rotation motor system as claimed in claim 8, wherein an inner ring of said first bearing unit applies the pre-loading force to an inner ring of said second bearing unit.

12. The limited rotation motor system as claimed in claim 11, wherein the pre-loading force on said first bearing unit is substantially equal to the pre-loading force on said second bearing unit.

13. The limited rotation motor system as claimed in claim 11, wherein the pre-loading force on said first bearing unit is greater than the pre-loading force on said second bearing unit.

14. The limited rotation motor system as claimed in claim 11, wherein the pre-loading force on said first bearing unit is less than the pre-loading force on said second bearing unit.

15. The limited rotation motor system as claimed in claim 11, wherein said first bearing unit is slidably mounted to said motor housing and said second bearing unit is fixed to said motor housing.

16. A limited rotation motor system comprising:
a helically shaped torsion member for providing resistive torque to a rotor shaft; and
pre-loading means for pre-loading a first bearing unit and a second bearing unit responsive, in part, to the helically shaped torsion member;
wherein a pre-loading force on said first bearing unit may be adjusted relative to a pre-loading force on said second bearing unit without attendant changes to the resistive torque provided by the torsion member.

17. The limited rotation motor system as claimed in claim 16, wherein the pre-loading force on said first bearing unit is substantially equal to the pre-loading force on said second bearing unit.

18. The limited rotation motor system as claimed in claim 16, wherein the pre-loading force on said first bearing unit is greater than the pre-loading force on said second bearing unit.

19. The limited rotation motor system as claimed in claim 16, wherein the pre-loading force on said first bearing unit is less than the pre-loading force on said second bearing unit.

20. The limited rotation motor system as claimed in claim 16, wherein said limited rotation motor system is employed in at least one of a raster scanning system and a wafer processing system.

21. The limited rotation motor system as claimed in claim 16, wherein the resistive torque provided by the torque means remains substantially constant at different system operating temperatures.

* * * * *